United States Patent Office 3,745,173
Patented July 10, 1973

3,745,173
PRODUCTION OF CARBOXYLIC ACIDS, ESTERS, ACID CHLORIDES, ANHYDRIDES, AND KETONES BY REACTION OF AN ORGANOMETALLIC COMPOUND WITH CARBON MONOXIDE
Patrick M. Henry, Wilmington, Del., assignor to Hercules Incorporated, Wilmington, Del.
No Drawing. Continuation-in-part of applications Ser. No. 625,021, Mar. 22, 1967, which is a continuation-in-part of application Ser. No. 479,662, Aug. 13, 1965. This application July 31, 1970, Ser. No. 60,148
Int. Cl. C07d 5/26, 63/16
U.S. Cl. 260—332.2 C       18 Claims

ABSTRACT OF THE DISCLOSURE

An organometal compound of a platinum group metal where the organo group is aryl, thienyl, or furyl reacts with carbon monoxide to produce a diorganoketone and a carboxylic compound which is an acid anhydride, an acid or an ester and the organometal compound can be made in situ from the corresponding organomercury compound for this purpose.

---

This application is a continuation-in-part of copending application Ser. No. 625,021, filed Mar. 22, 1967, which in turn is a continuation-in-part of application Ser. No. 479,662, filed Aug. 13, 1965, both now abandoned.

This invention relates to the carbonylation of organic compounds whereby a carbonylic compound of the class of carboxylic acids, esters, and anhydrides and ketones is produced.

In the aforementioned application Ser. No. 479,662, filed Aug. 13, 1965, now abandoned, there was described a process of reacting an organomercury compound with carbon monoxide and a Group VIII noble metal salt whereby an organocarboxylic acid, ester, or acid chloride or anhydride was produced. The Group VIII noble metal was indicated to enter into the reaction both directly and catalytically if the noble metal which is formed is converted back to its salt.

In accordance with the present invention it has now been found that there is also produced in this reaction a ketonic compound, and it is now more clearly indicated that the organo-metal compound of the Group VIII noble metal is an intermediate, as shown hereinafter, even though used in less than molecular amounts.

The products of this invention are carbonyl compounds and carboxylic compounds, which carboxylic compounds when produced in the absence of water or alcohols are anhydrides and particularly mixed anhydrides of the carboxylic acid of the carboxylic compound and the anion present in the system. In the presence of the halide anion, the mixed anhydride is an acid halide having the —COHal group. The carboxylic compound produced by the process of this invention is a carboxylic acid when water is present in the process, or an ester when an alcohol is included in the process. The carbonyl compounds are simultaneously produced in variable yields as described hereinafter.

In its simplest aspect, a separately produced organometal compound of a Group VIII noble metal is contacted with carbon monoxide at a reaction temperature whereby the organo-carboxylic compound is produced and the Group VIII metal is converted to a lower valence state.

In an alternative procedure, the organometal compound of the Group VIII noble metal is produced in situ by reaction of an organomercury compound and a Group VIII noble metal salt under substantially the same reaction conditions for reacting the separately produced organometal compound of the Group VIII metal with carbon monoxide, and the so-produced organometal compound of the Group VIII metal reacts with the carbon monoxide.

In another alternative procedure, the organomercury compound of the first alternative procedure is produced in situ, and from it the organometal compound of the Group VIII metal is produced in situ by contacting a mercuriatable organic compound with both a mercuric salt and a Group VIII metal salt and carbon monoxide simultaneously, and the organomercury salt which forms first is converted to the organometallic salt of the Group VIII metal which in turn reacts with carbon monoxide to produce the products of this invention.

The reactions involved are expressed as follows (where Q is an organo group attached to the metal by a carbon to metal linkage):

(A) $QHgCl + PdCl_2 \rightleftharpoons QPdCl + HgCl_2$
(B) $QPdCl + CO \rightleftharpoons QCOPdCl$
(1) $QCOPdCl \rightleftharpoons QCOCl + Pd°$
(2) $QCOPdCl + QPdCl \rightarrow QCOQ + PdCl_2 + Pd°$
(3) $QPdCl \rightarrow QCl + Pd°$
(4) $2QPdCl \rightarrow Q-Q + PdCl_2 + Pd°$ Steps A and B are reversible reactions, and the products of these reactions enter into other reactions, the first of which is 1, which is also reversible. In order to produce the aroyl chloride of reaction 1 as the product at greatest equilibrium yield, the CO concentration is increased by increasing the CO pressure. If the QCOCl is converted to the ester by reaction with alcohol, or to the acid by reaction with water, or if the precipitated palladium is removed, the reversal of reaction 1 is prevented.

The QCOPdCl produced in reaction B also undergoes reaction with QPdCl to produce the ketone QCOQ, and this reaction, being second order, is influenced by concentration and time. If the QCOCl is not removed from the Pd metal produced in reaction 1, the reversal of this reaction will aid in the further reaction of QCOPdCl with QPdCl, and this is influenced by time. The side reactions 3 and 4 are minor reactions which use up QPdCl.

When Rh is substituted for the Pd in the above reactions, reaction 2 is greatly influenced by the greater reactivity of QCORhCl with QRhCl. Rh is, therefore, preferred in the production of ketones.

By-product formation due to reactions 3 and 4 is diminished by increasing CO pressure.

In the reaction 1 above, the acid chloride is produced in the absence of reagents known to react with acid chlorides, e.g. water, alcohols, and organic acids. To produce the acid in situ, water is included among the reagents. To produce the ester, an alcohol known to react with acid chlorides is included among the reagents. To produce a mixed anhydride, an aliphatic acid is included among the reagents.

The process whereby the carboxylic compound is produced from the organomercury compound is expressed by the following reaction:

$$QHgY + M'X_2 + CO \rightarrow QCOX + HgYX + M'$$

and, if the organomercury compound is produced in situ, by the following reaction:

$$QH + HgY_2 + M'X_2 + CO \rightarrow QCOX + HgYX + M' + HY$$

where Y is an anion or Q, X is an anion, Q is an aryl, thienyl or furyl organo group and M' is a Group VIII noble metal. QCOX is an anhydride of the acid, QCOOH and HX. In the above equations for this process, X and Y are shown as representing different anions in the different compounds, if desired. However, X and Y may be the same anion.

Methods of preparing the organomercury compounds by the reaction used in the in situ preparation, as well as by other methods, including those which produce $Q_2Hg$, are well known in the art. The organomercury compounds may be of the type $Q(HgX)_y$ where $y$ represents the number of HgX groups in the compound. This may be as high as 5 but is usually 1 or 2. When $y$ is greater than 1, the products are polycarboxylic compounds.

Similarly, the organometallic compound of the Group VIII noble metal is a compound whose structure is expressed by the formula $Q(M'X)_y$ or $Q(M'X_2)_y$, depending on whether the valence of the Group VIII noble metal, M', is two or three, respectively. The number of $M'X$ or $M'X_2$ groups in the compound may be as much as 5, but ordinarily will be 1 or 2. These groups may be substituted in the same ring of the parent organic compound or in different rings in the case where said compound is a polynuclear aromatic compound. For example, when $y$ is 2 and the parent compound is naphthalene, the groups may be in the 1,4 positions or the 1,8 positions. As a further example, when $y$ is 2 and the parent compound is biphenyl, the groups may be in the 2,4 positions or the 4,4' positions.

The noble metals which are operable in this invention are those of the platinum group Ru, Rh, Pd, Os, Ir, and Pt. Palladium is preferred for the production of carboxylic compounds, rhodium for the production of ketones.

The anion of the palladium compounds is a halide, nitrate, sulfate, phosphate, chlorate or other inorganic anion. Palladium compounds of organic acids such as acetic acid, and the chelates such as the acetylacetonate, and complexes such as carbonyls and complex salts with alkali metal salts are all useful. The chloride anion is preferred.

The mercury compound used for in situ preparation of the organomercury salt is preferably a salt such as the halide or acetate and the halide is preferably the chloride. Also operable are other salts such as the nitrate, sulfate, perchlorate, oxalate, phosphate and arsenate. Their reactivity with the organo group selected is variable as is known in the art, and the more reactive salt is generally selected.

In general, the anion X in $Q(M'X)_y$ or $Q(M'X_2)_y$ may be a halide, such as chloride or bromide, an acylate or halogen-substituted acylate having two to eight carbon atoms such as acetate, propionate, butyrate, isobutyrate, caproate, caprylate, monochloroacetate, dichloroacetate or trichloroacetate, an acetylacetonate, an aryl sulfonate, such as p-toluenesulfonate or benzenesulfonate, an alkyl sulfonate, such as methyl sulfonate or ethyl sulfonate, nitrate, sulfate, phosphate, arsenate, chlorate or perchlorate. The halides and acylates are preferred.

Mercury and the Group VIII noble metal are recovered for reuse in the process. The palladium metal, for example, can be reconverted in situ or outside the system. The reconversion of the palladium to a palladium salt by a redox system, particularly using copper salts and air, is well known and is readily adaptable here. Since the palladium metal ($Pd^\circ$) may be reconverted to palladium salt chemically, with or without electrical energy, the process may be continued with less than the stoichiometric amounts of palladium. In such a process, any of the well-known redox systems may be used. Cupric chloride is particularly useful in such a redox system.

When the organomercury compound is capable of being produced as a separate step of the reaction, the scope of the organo groups appears to be limited only by the capability of producing the organometallic compound of mercury. As is well known, organomercury compounds can be prepared from other organometallic compounds of metals of Groups I-A, II-A and III-A of the Periodic Chart of the Elements. The organo group of organometallic compounds of these metals of Groups I-A, II-A and III-A are usually limited to organo groups free of carbonyl groups, carboxyl groups, primary and secondary amine groups, OH groups and SH groups. The organomercury compounds so produced are similarly limited as to organo groups. There are, however, many organomercury compounds which can be prepared strictly from an organo compound by direct substitution of a hydrogen by reaction with the mercury salt and these may be prepared in a separate step, or in many cases they may be prepared in situ.

When an organomercury compound can be made directly from the organo compound and the mercury salt, the organo group may contain a wider variety of functional groups than would be possible if the organomercury compound were made from an organometallic compund of Groups I-A, II-A or III-A metals. Organo compounds which react with mercury salts to form the organomercury compound directly include: benzene, toluene, xylene, phenol, catechol, phloroglucinol, anisole, 2,6-di-t-butylphenol, thiophene, and furan, and alkyl, aralkyl, halogen, hydroxy, alkoxy, nitro and carboxylic substitution products thereof.

Organomercury compounds which may be made from other organometallic compounds include those in which the organo group is phenyl, tolyl, cumyl, cymyl, xylyl, anthracyl, phenanthryl, phenylene, and their alkyl, halo, phenoxy, and alkoxy substitution products. These organomercury compounds may be of the $Q(HgX)_y$ type in which $y$ is greater than 1 and from which polycarboxylic compounds may be prepared.

In general, then, the organo group Q in the organometallic compound of the formula $Q(M'X)_y$ or $Q(M'X_2)_y$ is an aryl, thienyl or furyl group. More specifically, Q is an organic radical which may be furyl, thienyl or an aryl or substituted aryl radical wherein the aryl radical may be phenyl, phenylene, naphthyl, naphthylene, anthryl, anthrylene, phenanthryl, phenanthrylene, biphenylyl, biphenylene or phenyleneoxyphenylene. These aryl radicals may be substituted with one or more alkyl, aryl, aralkyl, alkaryl, alkoxy, aryloxy, dialkylamino, alkyl aryl amino, hydroxy, carboxy, carboalkoxy, halogen or nitro groups. The alkyl in any of these substituent groups normally will contain from one to four carbon atoms. The number of substituent groups may be as many as five, but ordinarily will be no more than three.

The organometal compounds of the Group VIII noble metals are preferably prepared from the intermediate organomercury compounds. However, organometal compounds of Group VIII noble metals are also producible from organolead or organotin compounds in situ as in the present invention. They are also produced from organometal compounds of metals of Groups I-A, II-A and III-A. They are preferably produced in situ from the organomercury compounds because of the ease of handling of the reagents.

The temperature for effecting the process of this invention is 0° C. to about 250° C. The preferred range is from about 20° to about 150° C. The temperature may varied within the range over the course of the reaction.

The process may be carried out in glass, ceramic, or inert metal reaction vessels. It is preferable to use equipment not subject to amalgamation by mercury. However, vessels with amalgamated walls can also be used effectively.

A liquid reaction medium, such as provided by a solvent, is desirable in the process. When acid anhydrides are to be produced, inert solvents may be selected from among the inert volatile solvents having a high dielectric constant, preferably above about 5. Acetonitrile, acetone, nitromethane, nitroethane and dimethyl formamide and the like are inert and may be used with any of the reagents. Hydrocarbons such as toluene are useful in some cases. Acetic acid may be used as the solvent when an organic anhydride or acid is desired. The acid may also be produced by having water present when any of these solvents is used. Any of these solvents may be anhydrous since the initially formed mixed anhydride is readily reacted with water subsequently to form the acid.

When an ester is desired, the alcohol of the ester may be used as reagent and solvent. The alcohol may also be used in stoichiometric amounts with hydrocarbon or chlorinated hydrocarbon solvents. When the alcohol is used in low amounts, care is needed to exclude water which would reduce the yield of ester. When a large excess of alcohol is used, some water can be tolerated, as is well known in esterification reactions. The alcohol may be mono-, di-, or trihydric and preferably is a lower aliphatic monohydric alcohol of 1 to 6 carbon atoms.

High pressure is not required for the reaction. The carbon monoxide may be introduced at atmospheric pressure and be introduced as needed, or the carbon monoxide may be introduced under elevated pressure and the drop in pressure used as an indication of the course of the reaction. Pressures may range from 1 atmosphere to 3000 atmospheres. Pressures in the range of 100 to 1500 atmospheres are convenient. As indicated earlier, pressure does favor the equilibrium of reaction 1.

The metal group designations used herein refer to the Periodic Chart of the Elements such as is published by Fischer Scientific Company and such as appears in Handbook of Chemistry and Physics, 33rd edition, pages 342–343 (1951).

Examples of organometallic compounds which react with carbon monoxide in accordance with this invention are phenyl palladium chloride, p-tolyl palladium chloride, cumyl palladium chloride, cymyl palladium chloride, xylyl palladium chloride, anthranyl palladium chloride, chlorophenyl palladium chloride, nitrophenyl palladium chloride, methoxyphenyl palladium chloride, phenylene bis(palladium chloride), phenyleneoxyphenylene bis(palladium chloride), carbomethoxy phenyl palladium chloride, furyl palladium chloride, furyl bis(palladium chloride), thienyl palladium chloride, thienyl bis(palladium chloride), and the corresponding bromides, and the corresponding rhodium compounds and isomers and homologs thereof.

Typical products are benzoic acid, benzoyl chloride, methyl benzoate, benzophenone, toluic acid, toluyl chloride, methyl toluate, ditolyl ketone, cumic acid, cumyl chloride, methyl cumate, dicumyl ketone, methylcumic acid, methylcumyl chloride, methyl methylcumate, dicumyl ketone, xylene carboxylic acid, xylene carboxylic acid chloride, carbomethoxyxylene, dixylyl ketone, anthroyl chloride, anthroic acid, methyl anthroate, chlorobenzoyl chloride, chlorobenzoic acid, methyl chlorobenzoate, bis(chlorophenyl)ketone, nitrobenzoic acid, nitrobenzoyl chloride, methyl nitrobenzoate, bis(nitrophenyl) ketone, phthalic acid, phthalyl chloride, dimethyl phthalate, p,p'-diphenylether dicarboxylic acid, furoic acid, furoyl chloride, dimethyl furoate, difuryl ketone, thienoic acid, thienyl chloride, methyl thiofuroate, bis(thienyl) ketone, and homologs and isomers thereof.

Most of the compounds produced by this invention are well known, and many are commercial products. The acids have utility not only as titrimetric standards and as industrial products but also as preservatives against mold growth in proteinaceous and carbohydrate substances which normally support mold growth. They are useful also as modifiers of urea-aldehyde resins, and alkyd resins. The dibasic acids are useful in alkyd and polyester resins. The lower alkyl esters and ketones are perfume modifiers and fixatives as well as solvents for synthetic resins and nitrocellulose. The thienic esters are particularly interesting in this respect.

The process of this invention is illustrated by the following examples:

EXAMPLE 1

A mixture of 13.82 grams (150 mmoles) toluene, 79.5 grams (250 mmoles) mercuric acetate, 10 ml. 98% sulfuric acid, 21.78 grams (125 mmoles) $K_2SO_4$, 33.5 grams (250 mmoles) cupric chloride and 2.5 mmoles palladium dichloride in 250 ml. acetic acid was stirred with carbon monoxide under 2000 p.s.i.g. pressure at 120° C. for 6 hours. From this mixture 3.5 mmoles toluic acid was isolated. The yield was 3% of theory.

EXAMPLE 2

A mixture of 12.6 grams (80 mmoles) anisole, 79.5 grams (250 mmoles) mercuric acetate, 15 ml. 98% sulfuric acid, 10.89 grams (62.5 mmoles) $K_2SO_4$, 16.75 grams (125 mmoles) cupric chloride, and 2.5 mmoles palladium dichloride in 250 ml. acetic acid was stirred with carbon monoxide under 2000 p.s.i.g. pressure at 100° C. for 6 hours. From this mixture 14.3 mmoles anisic acid was isolated. The yield was 23% of theory.

EXAMPLE 3

A mixture of 3.57 grams (10 mmoles) p-carboxyphenyl mercuric chloride, 2.68 grams (20 mmoles) cupric chloride, and 1 mmole palladium chloride in 25 ml. acetic acid (not anhydrous) was stirred in an atmosphere of carbon monoxide at 25° C. for 12 hours at atmospheric pressure. A total of 8 mmoles carbon monoxide was absorbed and 3.9 mmoles terephthalic acid was isolated. The yield was 39% of theory.

EXAMPLE 4

A mixture of 3.27 grams (10 mmoles) p-tolyl mercuric chloride, 2.68 grams (20 mmoles) cupric chloride, and 1 mmole palladium chloride in 25 ml. acetic acid (not anhydrous) was stirred in an atmosphere of carbon monoxide at 25° C. for 12 hours at atmospheric pressure. A total of 10 mmoles carbon monoxide was absorbed and 3.1 mmoles p-toluic acid was isolated. The yield was 31% of theory.

EXAMPLE 5

A mixture of 2.27 grams (10 mmoles) bis(beta-naphthyl) mercury, 2.68 grams (20 mmoles) cupric chloride, and 1 mmole palladium chloride in 25 ml. acetic acid (not anhydrous) was stirred in an atmosphere of carbon monoxide at 25° C. for 36 hours at atmospheric pressure. A total of 10 mmoles carbon monoxide was absorbed and 1.2 mmoles beta-naphthoic acid was isolated. The yield was 12% of theory.

EXAMPLE 6

A mixture of 15 grams (120 mmoles) benzoic acid, 38 grams (120 mmoles) mercuric acetate, 2 ml. 70% perchloric acid and 40 mmoles palladium diacetate in 150 ml. acetic acid was stirred under 1000 p.s.i.g. pressure of carbon monoxide at 80° C. for 8 hours. There was obtained a mixture of acids in 0.5% of theoretical yield, of which 70% was isophthalic acid and 30% was terephthalic acid.

EXAMPLE 7

A mixture of 27 grams (250 mmoles) anisole, 80 grams (250 mmoles) mercuric acetate, 67 grams (500 mmoles) cupric chloride, 43 grams (500 mmoles) sodium nitrate, and 2.5 mmoles palladium dichloride in 250 ml. acetic acid (not water-free) was stirred under 2000 p.s.i.g. pressure of carbon monoxide at 100° C. for 6 hours. The product was analyzed by gas chromatography. The yield was 7.9 mmoles anisic acid (3% of theory).

EXAMPLE 8

A mixture of 0.313 gram (1 mmole) phenyl mercuric chloride and 0.177 gram (1mmole) palladium dichloride in 25 ml. acetonitrile was contacted with carbon monoxide at 25° C. and atmospheric pressure for 20 hours. Analysis of the product by infrared spectra showed the product to be benzoyl chloride. The amount of carbon monoxide absorbed was 0.8 mmole.

EXAMPLE 9

A mixture of 0.327 gram (10 mmoles) para-tolylmercuric chloride, and 1.77 grams (10 mmoles) palladium dichloride in 25 ml. methanol was contacted with carbon monoxide at 25° C. and atmospheric pressure for 20 hours. The amount of carbon monoxide absorbed was 8 mmoles and the product was shown by gas chromatography to be para-toluic acid. The yield was 2.7 mmoles (27% of theory).

EXAMPLE 10

A mixture of 0.354 gram (1 mmole) diphenyl mercury and 0.177 gram (1 mmole) palladium dichloride in 25 ml. acetonitrile was contacted with carbon monoxide at 25° C. and atmospheric pressure for 2 hours. Analysis of the product by infrared spectra showed the product to be benzoyl chloride.

EXAMPLE 11

A mixture of 3.27 grams (10 mmoles) p-tolyl mercuric chloride, 2.68 grams (20 mmoles) cupric chloride, 0.4 gram p-toluene-sulfonic acid and 1.0 mmole palladium chloride in 25 ml. methanol was stirred at atmospheric pressure with carbon monoxide at 25° C. for 5 hours. During this time, 8 mmoles carbon monoxide was absorbed. Analysis by gas chromatography showed the product to be 2.5 mmoles methyl toluate, which is a yield of 25% of theory.

EXAMPLE 12

A mixture of 16.2 grams (150 mmoles) anisole, 80 grams (250 mmoles) mercuric acetate, 33.5 grams (250 mmoles) cupric chloride, 22 grams (125 mmoles) potassium sulfate, 10 ml. 98% sulfuric acid, and 2.5 mmoles palladium dichloride in 250 ml. acetic acid (not water-free) was stirred under 2000 p.s.i.g. pressure of carbon monoxide at 100° C. for 6 hours. The product was analyzed by gas chromatography. The yield was 5 mmoles anisic acid (4% of theory).

EXAMPLE 13

A mixture of 11.8 grams (150 mmoles) benzene, 80 grams (250 mmoles) mercuric acetate, 10 ml. 98% sulfuric acid, 22 grams (125 mmoles) $K_2SO_4$, 33.5 grams (250 mmoles) cupric chloride, and 2.5 mmoles palladium dichloride in 250 ml. acetic acid was stirred with carbon monoxide under 2000 p.s.i.g. pressure at 120° C. for 8 hours. From this mixture 4.8 mmoles benzoic acid was isolated. The yield was 4% of theory.

EXAMPLE 14

A mixture of 9.2 grams (100 mmoles) toluene, 38 grams (120 mmoles) mercuric acetate, 2 ml. 70% perchloric acid and 1.0 mmole palladium diacetate in 150 ml. acetic acid was stirred under 1000 p.s.i.g. pressure of carbon monoxide at 80° C. for 6 hours. There was obtained 8.8 mmoles toluic acid of which 94-96% was the para isomer and about 4% was a mixture of about equal amounts of meta and ortho isomers. The yield was 15% of theory.

EXAMPLE 15

In a pressure vessel at 30° C. placed 10 mmoles phenylmercuric chloride and 10 mmoles anhydrous cupric chloride. The vessel was flushed with carbon monoxide at atmospheric pressure and 10 ml. of 0.1 M $LiPdCl_3$ in acetonitrile was injected. After 80 minutes, 116 ml. carbon monoxide had been absorbed and absorption had ceased. The resulting reaction mixture was shown by vapor phase chromatography to comprise:

| | Percent yield |
|---|---|
| 0.0935 M in biphenyl | 18.7 |
| 0.058 M in benzophenone | 12 |
| 0.41 M in benzoyl chloride | 41 |
| 0.11 M in chlorobenzene | 11 |

EXAMPLE 16

When Example 15 was repeated at about 3.5 atmospheres pressure of carbon monoxide, the yields were biphenyl 2%, benzophenone 29%, benzoyl chloride 22%, and chlorobenzene 12%.

EXAMPLE 17

When Example 16 was repeated using methanol in place of acetonitrile, the yields were biphenyl—trace, benzophenone 16%, methyl benzoate 30%, and chlorobenzene—trace.

EXAMPLE 18

A mixture of 7.16 g. (20 mmoles 3-nitrophenyl murcuric chloride and 200 ml. of 0.1 M $LiPdCl_3$ in acetonitrile was stirred with carbon monoxide under 1 atmosphere pressure for 3.5 hours. The resulting mixture was filtered and evaporated and crystallized from acetic acid. The yield of 3,3'-dinitrobenzophenone, M.P. 155-155.5° C., was 0.685 g.

EXAMPLE 19

A mixture of 10 mmoles phenylmercuric chloride, 0.1 mmole of $RhCl_3 \cdot 3H_2O$ and 10 ml. acetonitrile was stirred with carbon monoxide at 100° C. under 3-4 atmospheres for 5 hours. Gas chromatographic analysis showed a yield of 50% of theory of benzophenone.

EXAMPLE 20

A mixture of 10 mmoles phenylmercuric chloride, 0.1 mmole of $RhCl(CO)[P(n-C_4H_9)_3]_2$ in 10 ml. toluene was heated at 100° C. under 3-4 atmospheres of carbon monoxide for 2.5 hours. Gas chromatographic analysis showed the mixture to be 0.24 M in benzophenone corresponding to a 48% yield.

EXAMPLE 21

A mixture of 10 mmoles of anisylmercuric chloride and 0.1 mmole of $RhCl_3 \cdot 3H_2O$ was stirred for 20 hours in 10 ml. acetonitrile solution with carbon monoxide at 100° C. under 3-4 atmospheres pressure. Gas chromatographic analysis showed the resulting solution to be 0.315 M in 4,4'-dimethoxybenzophenone, and from this mixture was recovered 0.63 g. 4,4'-dimethoxybenzophenone.

EXAMPLE 22

A mixture of 10 mmoles of 3-nitro-4-chlorophenylmercuric chloride and 0.1 mmole of $RhCl_3 \cdot 3H_2O$ was stirred for 20 hours in 10 ml. acetonitrile solution at 100° C. with carbon monoxide under 3-4 atmospheres pressure. There was obtained 0.22 gram 3,3'-dinitro-4,4'-dichlorobenzophenone.

EXAMPLE 23

A mixture of 10 mmoles methyl 3-chloromercuribenzoate and 0.1 mmole $RhCl_3 \cdot 3H_2O$ was stirred for 20 hours in 10 ml. acetonitrile solution with carbon monoxide at 100° C. under 3-4 atmospheres pressure. From this solution was recovered 0.23 g. 3,3'-bis(carbomethoxy)benzophenone.

EXAMPLE 24

A mixture of 6.82 g. (20 mmoles) 3,4-dimethylphenylmercuric chloride and 0.051 g. (0.2 mmole) $RhCl_3 \cdot 3H_2O$ in 20 ml. acetonitrile was stirred for 20 hours in 20 ml. acetonitrile solution with carbon monoxide under 3-4 atmospheres pressure at 100° C. The product recovered by crystallization from hexane was 0.28 g. (12% yield) of 3,3',4,4'-tetramethylbenzophenone, M.P. 143-4° C.

EXAMPLE 25

A mixture of 4.27 g. (10 mmoles) tin tetraphenyl and 0.026 g. (0.1 mmole) $RhCl_3 \cdot 3H_2O$ in 10 ml. acetonitrile solution was stirred with carbon monoxide under 3-4 atmospheres pressure at 100° C. for 20 hours. Gas chromatographic analysis showed the resulting mixture to be 0.033 M in benzophenone (7% of theory).

EXAMPLE 26

A mixture of 5.15 g. (10 mmoles) lead tetraphenyl and 0.026 g. (0.1 mmole) $RhCl_3 \cdot 3H_2O$ in 10 ml. acetonitrile solution was stirred for 20 hours with carbon monoxide under 3-4 atmospheres pressure at 100° C.

Gas chromatographic analysis showed the resulting solution to be 0.045 M in benzophenone (9% of theory).

EXAMPLE 27

A mixture of 1.77 grams of palladium dichloride, 0.18 gram of lithium chloride and 25 ml. of acetic acid was warmed to dissolve as much of the palladium dichloride as possible. The mixture then was cooled to 25° C. and to it was added 4.3 grams of p-phenoxyphenylmercuric acetate. Carbon monoxide was introduced into the reaction mixture at atmospheric pressure until 6 mmoles of carbon monoxide had been absorbed.

The acetic acid solvent was removed from the reaction product mixture by evaporation and the remaining solids were extracted with ether. After filtration, the ether was removed from the filtrate by evaporation and the resulting solids were taken up in 10% aqueous sodium hydroxide. The aqueous solution was washed with ether, then neutralized with aqueous hydrochloric acid. The precipitate was collected, washed with water and dried. The yield of p-phenoxybenzoic acid was 0.73 gram.

EXAMPLE 28

A mixture of 3.54 grams of palladium dichloride, 1.68 grams of lithium chloride and 50 ml. of acetic acid was warmed, then cooled, as in Example 27. To the mixture then was added 6.9 grams of diphenyl ether 4,4'-bis(mercuric acetate). Following the procedure of Example 27, carbon dioxide was introduced until 9 mmoles of carbon dioxide had been absorbed, and the resulting reaction product mixture was worked up to recover 0.29 gram of product composed primarily of diphenyl ether 4,4'-dicarboxylic acid.

Further exemplifying the process of this invention with respect to organomercury compounds which are reacted with carbon monoxide in the presence of palladium salts with resultant formation of carboxylic compounds wherein a carboxylic group is substituted for each mercury group present are the following organomercury compounds:

(a) $C_6H_4(HgCl)_2$ (b)

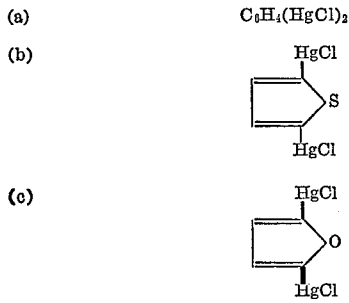

(c)

What I claim and desire to protect by Letters Patent is:

1. The process which comprises contacting an organometallic compound of the formula $Q(M'X)_y$ or $Q(M'X_2)_y$ with carbon monoxide at a temperature in the range of 0° C. to 250° C., Q being an organic radical selected from the group consisting of furyl, thienyl and aryl radicals selected from the group consisting of phenyl, phenylene, naphthyl, naphthylene, anthryl, anthrylene, phenanthryl, phenanthrylene, bipenylyl, biphenylene and phenyleneoxyphenylene, and said aryl radicals substituted with at least one substituent selected from the group consisting of alkyl, aryl, aralkyl, alkaryl, alkoxy, aryloxy, dialkylamino, alkylarylamino, hydroxy, carboxy, carboalkoxy, halogen and nitro, M' is a noble metal selected from the group consisting of ruthenium, rhodium, palladium, osmium, iridium and platinum, X is an anion selected from the group consisting of halide, acylate, halogen-substituted acylate, acetylacetonate, aryl sulfonate, alkyl sulfonate, nitrate, sulfate, phosphate, arsenate, chlorate and perchlorate, and y is a number from one to two.

2. The process of claim 1 in which $Q(M'X)_y$ or $Q(M'X_2)_y$ is produced in situ by contacting $Q(HgX)_y$ with $M'X_2$ or $M'X_3$.

3. The process of claim 2 in which $Q(HgX)_y$ also is produced in situ by contacting $Q(H)_y$ with $_y(HgX_2)$.

4. The process of claim 1 in which the reaction is carried out in the presence of an alcohol and an ester thereof is produced.

5. The process of claim 1 in which the reaction is carried out in the presence of water and a carboxylic acid is produced.

6. The process of claim 1 in which M' is palladium.

7. The process of claim 1 in which M' is rhodium.

8. The process of claim 6 in which Q is furyl.

9. The process of claim 6 in which Q is thienyl.

10. The process of claim 6 in which Q is aryl.

11. The process of claim 6 in which Q is substituted aryl.

12. The process of claim 7 in which Q is aryl.

13. The process of claim 7 in which Q is substituted aryl.

14. The process of claim 10 in which the aryl radical is phenyl, y is 2, the reaction is carried out in the presence of water and a benzene dicarboxylic acid is produced.

15. The process of claim 10 in which the aryl radical is phenyleneoxyphenylene, y is 2, the reaction is carried out in the presence of water and a diphenyl ether dicarboxylic acid is produced.

16. The process of claim 11 in which the substituted aryl radical is methoxyphenyl, y is 1, the reaction is carried out in the presence of water and a methoxybenzoic acid is produced.

17. The process of claim 11 in which the substituted aryl radical is phenoxyphenyl, y is 1, the reaction is carried out in the presence of water and a phenoxybenzoic acid is produced.

18. The process of claim 12 in which the aryl radical is phenyl, y is 1 and benzophenone is produced.

References Cited

UNITED STATES PATENTS 3,557,146  1/1971  Heck _____ 260—323.5

JAMES A. PATTEN, Primary Examiner

U.S. Cl. X.R.

260—347.3, 429 R, 429 AR, 433, 471 R, 473 R, 475 R, 476 R, 515 R, 515 P, 518 R, 520, 521 R, 544 A, 546, 591, 650 R, 670